Patented May 23, 1933

1,910,603

UNITED STATES PATENT OFFICE

ROBERT J. GOODRICH, OF SOUTH MILWAUKEE, AND JOHN CHARLES KINAHAN, OF MILWAUKEE, WISCONSIN, ASSIGNORS, BY MESNE ASSIGNMENTS, TO E. I. DU PONT DE NEMOURS & COMPANY, A CORPORATION OF DELAWARE

DIBENZANTHRONE DYESTUFF AND PROCESS OF PREPARING SAME

No Drawing.   Application filed September 4, 1928.   Serial No. 303,950.

This invention relates to a process for producing valuable coloring matters of the perylene series, more particularly to the coloring matters derived from dibenzanthrone and to the products.

It is an object of this invention to provide an improved method for the oxidation of perylene derivatives of the anthraquinone series, such as dibenzanthrone, whereby the oxidation products may be obtained in a highly purified state in a simple and economically practical manner.

It is a further object to provide a method whereby the starting material, as for example dibenzanthrone, may be used in the form of a wet press cake, thus eliminating the steps of drying and milling the starting material.

It is still a further object to furnish a method of isolating the final product.

Other and further important objects of this invention will become apparent from the following description and appended claims.

Heretofore known methods for the oxidation of these perylene derivatives have employed the following methods: the oxidation of a solution of the body in concentrated sulfuric acid by the use of manganese dioxide, or oxidation by the use of a mixture of concentrated sulfuric acid and nitric acid: See U. S. Patents 1,093,427, 1,531,260 and 1,531,261. In the processes using concentrated sulfuric acid, each of the known methods refers to the dissolving of the starting material in concentrated sulfuric acid. If manganese dioxide is employed as the oxidizing agent, the dyestuff obtained from dibenzanthrone is described as giving olive green shades or dull olive green shades on cotton. The heretofore described methods for the isolation of the coloring matter from the sulfuric acid have employed the step of drowning, but this results in the precipitation of certain of the impurities along with the coloring matter. The step of drowning the reaction mass necessitates the use of large volumes of water, large tanks for dilution and the handling of a dilute acid solution which is corrosive towards the diluting equipment and filtering apparatus. Since the oxidation reactions at best are accompanied by some side reactions and the original starting material, as for example dibenzanthrone, contains more or less impurities, the elimination of the impurities becomes an important issue in the process of preparation. The separation of the dyestuff from the impurities has not been adequately solved by known methods.

We have now discovered that dibenzanthrone can be oxidized in diluted sulfuric acid by the use of manganese dioxide to give dyestuffs of more desirable properties than have hitherto been described. In the use of diluted sulfuric acid, the starting material, as for example dibenzanthrone, is present in the reaction mass as a suspension. We are not certain of the effect taking place to give new products, but believe it is due to the fact that for the most part the finished product is out of solution and therefore largely out of the sphere of oxidation, thus preventing to a large extent over-oxidation.

In the use of a diluted sulfuric acid, we do not wish to limit our process to a definite strength of acid, for we have found that improved results may be obtained by even very small dilution of the original concentrated acids formerly specified, up to a minimum formation of by-products when about 85% concentration sulfuric acid is employed. Between 70 and 90% concentration, the best results are obtained. The oxidation reaction becomes weaker as the concentration of acid decreases until a point is reached at about 70% concentration when the process becomes practically inoperative. The oxidation may be performed in the presence of boric acid or without boric acid.

Where the oxidation is performed according to our process, the final product may be filtered directly from the oxidation mass in a relatively high state of purity. Where, however, the oxidation is performed according to previously disclosed methods, a dilution of the oxidation mass with water to correspond to the above dilution, results in the precipitation of a jelly mass that presents a difficult problem of filtration. We believe that the improved method of isolating is, to a large degree, dependent upon the improved method of oxidation whereby the formation of slow-filtering by-products is largely eliminated. It appears that the final product, being more or less in fine suspension at all times during the oxidation, is actually formed at such a slow speed that some crystalline structure may be possible. The products obtained by the use of our method of oxidation, whether the isolation is performed by known methods or in accordance with our invention, have more desirable properties than the previously described products. As an example of this, the oxidized dibenzanthrone prepared by our method is in such a state of purity that it dyes cotton a brilliant green shade as compared to the dull olive shades formerly obtained. It is obvious that our method which results in the obtaining of these products in a relatively high state of purity, constitutes a valuable improvement in the art since these dyestuffs are of great importance of themselves and also as starting materials for other products.

As a result of our invention, we are likewise able to use as starting material the wet press cake, as for example of dibenzanthrone without the necessity of first drying and milling. It has even been our experience in drying and milling the dibenzanthrone that small lumps are formed and these lumps after the oxidation appear in the final product unacted upon. In the use of the dibenzanthrone as a wet press cake, it is already in a very finely divided state capable of being easily wetted with the sulfuric acid. In practice, the press cake is blown as dry as possible in the press and then analyzed for moisture. Sulfuric acid of such an amount and strength is then used that after the press cake is charged into sulfuric acid the final concentration of the acid due to the dilution by the water in the cake has dropped to about 85% by weight on the organic free basis. ($H_2SO_4 : H_2O = 85 : 15$.) We obtain the dibenzanthrone thereby in a highly desirable physical form with respect to fineness and wettability for subsequent oxidation.

Without limiting our invention to any particular procedure, the following examples in which parts by weight are given, will serve to illustrate our method in its preferred form.

*Example 1*

10 parts of dibenzanthrone are added to 310 parts of 94% sulfuric acid at a temperature of 20 to 25° C. 5 parts of boric acid are then added and 34 parts of water as rapidly as possible keeping the temperature of the mass below 30° C. The suspension mass is then cooled to 15° C. and there are then added over a period of about one hour 12 parts of finely ground manganese dioxide. The mass is agitated at the above temperature for about 24 hours and then poured into 1500 parts of water. 10 parts of sodium bisulfite are added and the mass boiled for one hour. The mass is now diluted with 1500 parts of cold water and filtered. The filter cake is washed acid free with water.

The dyestuff thus obtained dyes cotton from an alkaline hydrosulfite vat blue shades, changing to a brilliant green shade on treatment with suitable oxidizing agents.

*Example 2*

A finely ground aqueous paste containing 10 parts of dibenzanthrone and 34 parts of water is added to 310 parts of 94% sulfuric acid, while keeping the temperature below 25° C. 5 parts of boric acid are added and the mass stirred until a smooth suspension is obtained. The oxidation and isolation is performed as in Example No. 1 and the identical product is obtained.

*Example 3*

The suspension of the dibenzanthrone and the oxidation is performed exactly as in Example No. 1. The oxidation mass after stirring for 24 hours is filtered directly.

*Example 4*

The entire procedure is the same as Example No. 1 with the exception that no boric acid is used and the actual oxidation is performed at 0° C.

*Example 5*

10 parts of the product obtained in Example 2, U. S. Patent No. 1,093,427, are dissolved in 310 parts of concentrated sulfuric acid. At a temperature below 25° C., there are then added 34 parts of water, keeping the temperature below 25° C. The suspension mass is filtered and washed practically acid free. The product dyes cotton from an alkaline hydrosulfite vat blue shades, changing to a brilliant green shade on treatment with suitable oxidizing agents.

We are aware of the fact that certain details of our process may be varied without materially altering the results. For example, the temperature of the oxidation may be varied to include other temperatures than specified. The principle of this invention resides in certain improvements, such as the carrying out of the oxidation step in a diluted acid, whereby a more desirable product is obtained, whereby the wet press cake may be used as the starting material without first drying it, and whereby the isolating of the final product is accompanied by the elimination of certain impurities.

We are aware that numerous details of the process may be varied through a wide range without departing from the principles of this invention, and we, therefore, do not purpose

We claim as our invention:

1. The process of oxidizing dibenzanthrone compounds, which comprises treating said compounds suspended in sulfuric acid of lower concentration than that required to substantially dissolve the compounds, with manganese dioxide.

2. The process of oxidizing dibenzanthrone, which comprises treating dibenzanthrone suspended in sulfuric acid of lower concentration than that required to substantially dissolve the dibenzanthrone, with manganese dioxide.

3. The process of oxidizing dibenzanthrone compounds, which comprises treating said compounds suspended in sulfuric acid of between 70 and 90% concentration, with manganese dioxide.

4. The process of oxidizing dibenzanthrone, which comprises treating dibenzanthrone suspended in sulfuric acid of between 70 and 90% concentration, with manganese dioxide.

5. The process of oxidizing dibenzanthrone compounds, which comprises treating said compounds suspended in sulfuric acid of between 70 and 90% concentration, with manganese dioxide at a temperature below 25° C.

6. The process of oxidizing dibenzanthrone which comprises treating dibenzanthrone suspended in sulfuric acid of between 70 and 90% concentration, with manganese dioxide at a temperature below 25° C.

7. The process of oxidizing dibenzanthrone compounds, which comprises treating said compounds suspended in sulfuric acid of between 70 and 90% concentration, with manganese dioxide at a temperature below 25° C. in the presence of boric acid.

8. The process of oxidizing dibenzanthrone, which comprises treating dibenzanthrone suspended in sulfuric acid of between 70 and 90% concentration, with manganese dioxide at a temperature below 25° C. in the presence of boric acid.

9. The process of oxidizing dibenzanthrone compounds, which comprises effecting oxidation of a dibenzanthrone compound while suspended in sulfuric acid of lower concentration than that required to substantially dissolve the dibenzanthrone compound but above 70% concentration, with manganese dioxide, stirring the oxidation mass for a prolonged period of time and filtering directly without further dilution of the oxidation mass to obtain a purified product, the impurities remaining in the mother liquor.

10. The process of oxidizing dibenzanthrone, which comprises effecting oxidation of the dibenzanthrone while suspended in sulfuric acid of lower concentration than that required to substantially dissolve the dibenzanthrone but above 70% concentration, with manganese dioxide, stirring the oxidation mass for a prolonged period of time and filtering directly without further dilution of the oxidation mass to obtain a product adapted for use as a vat dyestuff.

11. In the process of oxidizing dibenzanthrone compounds, the step of oxidizing a dibenzanthrone compound suspended in sulfuric acid of greater than 70% concentration but of lower concentration than that required to substantially dissolve the dibenzanthrone compound, with manganese dioxide.

12. In the process of oxidizing dibenzanthrone, the step of oxidizing dibenzanthrone suspended in sulfuric acid of greater than 70% concentration but of lower concentration than that required to substantially dissolve the dibenzanthrone, with manganese dioxide.

13. In the process of preparing oxidized dibenzanthrone compounds, the steps of suspending the oxidized dibenzanthrone compounds in sulfuric acid of greater than 70% concentration but of lower concentration than that required to substantially dissolve the oxidized dibenzanthrone compounds and filtering the oxidized dibenzanthrone compounds directly without further dilution to isolate a product adapted for use as a dyestuff.

14. In the process of preparing oxidized dibenzanthrone, the steps of suspending the oxidized dibenzanthrone in sulfuric acid of greater than 70% concentration but of lower concentration than that required to substantially dissolve the oxidized dibenzanthrone and filtering the oxidized dibenzanthrone directly without further dilution to isolate a product adapted for use as a dyestuff.

15. In the process of preparing oxidized dibenzanthrone compounds, the step of adding an aqueous paste of dibenzanthrone compounds to concentrated sulfuric acid to form a suspension of the dibenzanthrone compounds in sulfuric acid of greater than 70% concentration but of lower concentration than that required to substantially dissolve the dibenzanthrone compounds.

16. In the process of preparing oxidized dibenzanthrone, the step of adding an aqueous paste of dibenzanthrone to concentrated sulfuric acid to form a suspension of the dibenzanthrone in sulfuric acid of greater than 70% concentration but of lower concentration than that required to substantially dissolve the dibenzanthrone.

17. In the process of preparing an oxidized dibenzanthrone compound, the steps of suspending the oxidized dibenzanthrone compound in sulfuric acid of between 70 and 90% concentration, and filtering the oxidized dibenzanthrone compound directly without further dilution to isolate a product adapted for use as a dyestuff.

18. In the process of preparing oxidized dibenzanthrone, the steps of suspending the oxidized dibenzanthrone in sulfuric acid of between 70 and 90% concentration and filtering the oxidized dibenzanthrone directly without further dilution to isolate a product adapted for use as a dyestuff.

19. In the process of preparing an oxidized dibenzanthrone compound, the step of forming an oxidized dibenzanthrone compound in a sulfuric acid medium of between 70 and 90% concentration, and filtering off the oxidized dibenzanthrone at a sulfuric acid concentration within said range.

20. In the process of preparing oxidized dibenzanthrone, the step of forming oxidized dibenzanthrone in a sulfuric acid medium of between 70 and 90% concentration and filtering off the oxidized dibenzanthrone at a sulfuric acid concentration within said range.

In testimony whereof, we have hereunto subscribed our names at Carrollville, Milwaukee County, Wis.

ROBERT J. GOODRICH.
JOHN CHARLES KINAHAN.